United States Patent [19]

Freye et al.

[11] Patent Number: 4,693,259

[45] Date of Patent: Sep. 15, 1987

[54] SELF-PROPELLED HARVESTER THRESHER

[75] Inventors: Theodor Freye; Franz Heidjann, both of Harsewinkel, Fed. Rep. of Germany

[73] Assignee: Claas OHG, Harsewinkel, Fed. Rep. of Germany

[21] Appl. No.: 753,674

[22] Filed: Jul. 10, 1985

[30] Foreign Application Priority Data

Jul. 20, 1984 [DE] Fed. Rep. of Germany ....... 3426790

[51] Int. Cl.⁴ .................... A10F 7/04; A10F 12/00
[52] U.S. Cl. ................. 130/27 R; 130/27 T; 130/27 Z; 56/146
[58] Field of Search ................. 130/272, 27 Z, 27 T, 130/27 R; 56/14.6

[56] References Cited

U.S. PATENT DOCUMENTS

| 4,150,525 | 4/1979 | De Busscher | 130/27 R X |
| 4,250,897 | 2/1981 | Glaser | 130/27 T |
| 4,254,780 | 3/1981 | Powell et al. | 130/27 R X |
| 4,528,992 | 7/1985 | Heidjen | 130/27 T X |

FOREIGN PATENT DOCUMENTS

| 2024706 | 5/1970 | Fed. Rep. of Germany. |
| 2946291 | 5/1981 | Fed. Rep. of Germany. |
| 3013113 | 10/1981 | Fed. Rep. of Germany. |
| 3049534 | 7/1982 | Fed. Rep. of Germany. |
| 3114382 | 11/1982 | Fed. Rep. of Germany. |
| 3324492 | 1/1985 | Fed. Rep. of Germany. |

OTHER PUBLICATIONS

Einrichtungen zur Kornabscheidung im Mähdrescher by: H. D. Kutzbach and Werner H. Grobler.

Primary Examiner—Stephen C. Pellegrino
Attorney, Agent, or Firm—Michael J. Striker

[57] ABSTRACT

A self-propelled harvester thresher has a threshing and separating mechanism, a flat sieve device, and a sieve drum for the straw-chaff-grain mixture located between the threshing and separating mechanism and the flat sieve device, wherein the sieve drum is located above the flat sieve device and has a feeding opening and an outlet opening with a screw transporting the product from the feeding opening to the outlet opening, and the thresher is provided with a returning member located immediately before the outlet opening.

9 Claims, 6 Drawing Figures

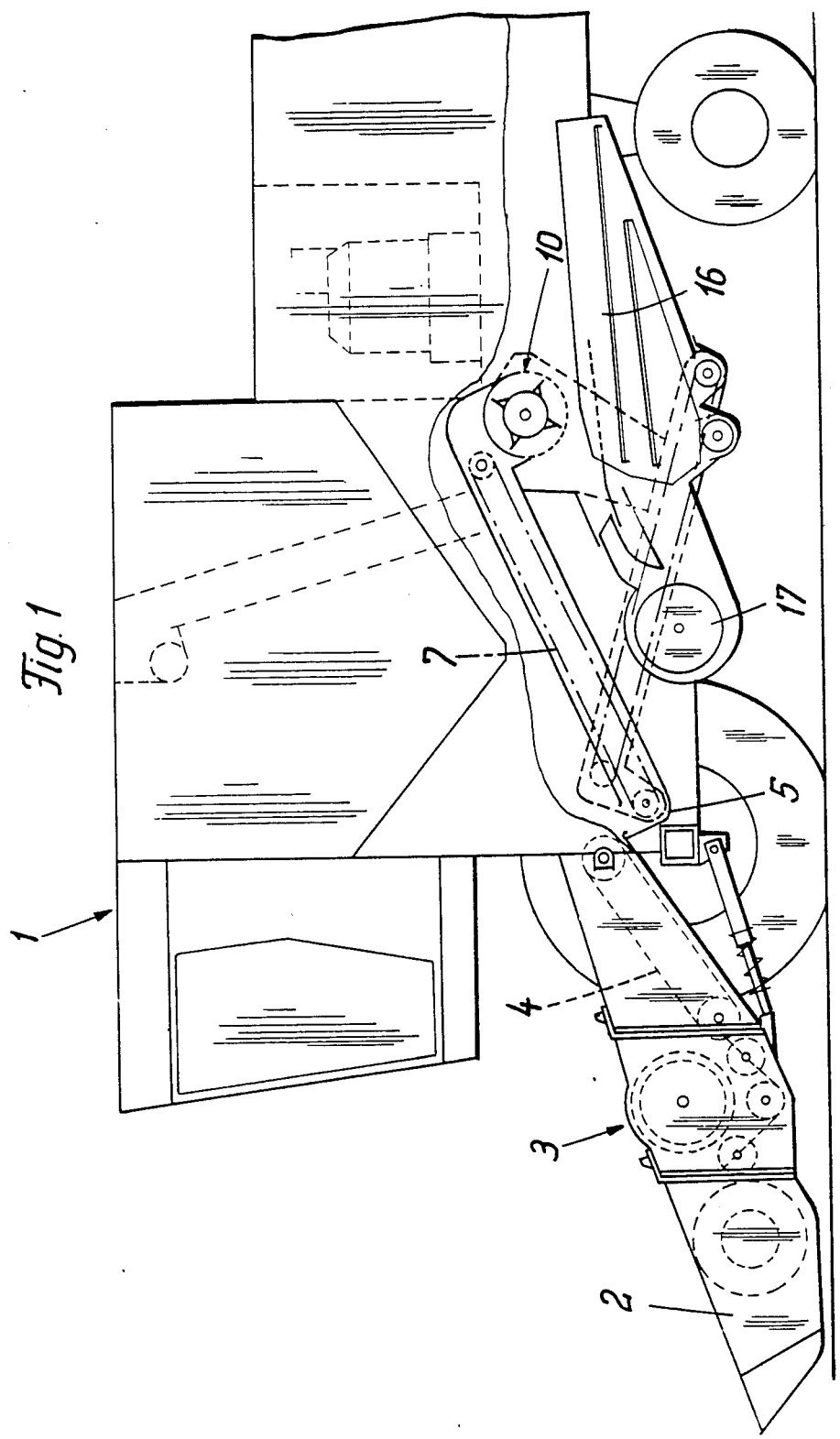

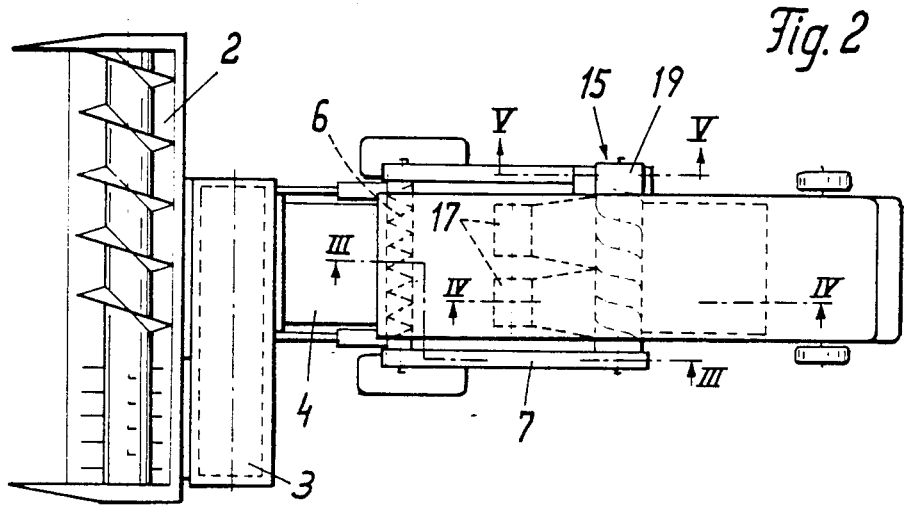
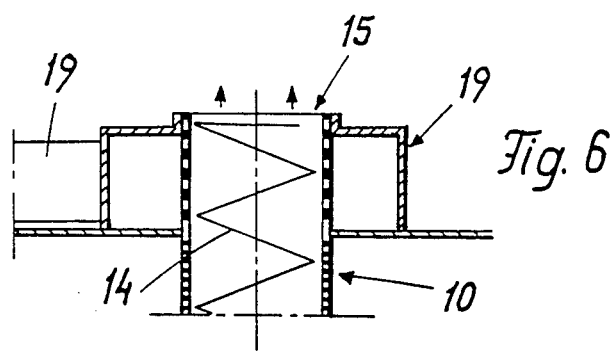
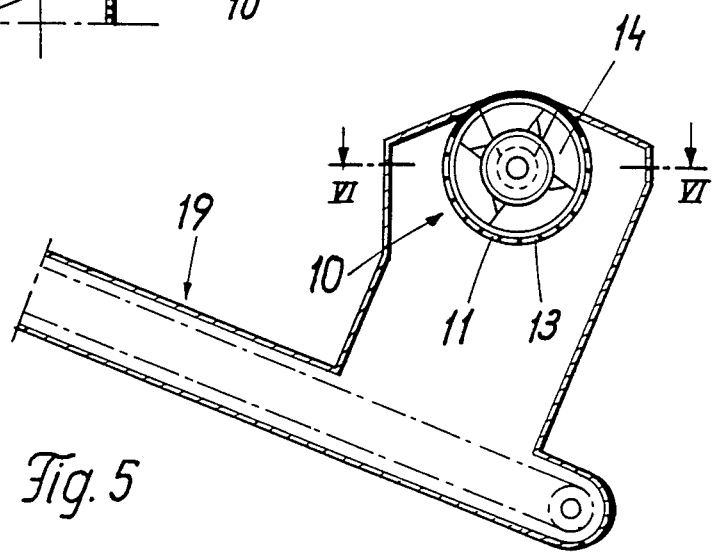

SELF-PROPELLED HARVESTER THRESHER

BACKGROUND OF THE INVENTION

The present invention relates to a self-propelled harvester thresher. More particularly, it relates to a self-propelled harvester thresher which has a threshing and separating device, for example hurdle shaker, as well as a sieve device, with a sieve drum for refining the straw chaff-grain mixture located between the threshing and separating device and the flat sieve device and extending transverse to the transporting direction of the thresher.

Harvester threshers of the abovementioned general type are known in the art. One of such harvester threshers is disclosed, for example in the German published application No. 3,049,534. The mixture straw-chaff and grain is thrown here by means of thrower against a rotatable sieve cylinder with a suction blower located inside the latter. As a result of this, the grains bounce back from the sieve cylinder whereas the chaff and the short straw mixture is held by the suction blower on the sieve cylinder. For releasing the straw-chaff mixture from the sieve cylinder, a part of the cylinder casing is covered from inside, so that here the suction blower cannot apply its suction action. In the region of this cover, a housing is associated with a cylinder casing from outside and a discharging screw is driveably supported in the housing. In such construction considerable problems take place in the sense of adherence and subsequent release of chaff and straw respectively to and from the sieve cylinder in the event of high throughput. In addition, a significant disadvantage of this harvester thresher is that coarser impurities and firmer straw and short straw particles, as well as the grain bounce from the sieve cylinder and cannot be separated. These coarse impurities substantially load the flat sieve device.

SUMMARY OF THE INVENTION

Accordingly, it is an object of the present invention to provide a harvester thresher of the abovementioned general type which avoids the disadvantages of the prior art.

More particularly, it is an object of the present invention to provide a harvester thresher of the abovementioned type in which coarse impurities can be separated from the harvested product before reaching the flat sieve device, with high reliability.

In keeping with these objects and with others which will become apparent hereinafter, one feature of the present invention resides, briefly stated, in a self-propelled harvester thresher in which a sieve drum is stationarily arranged above a flat sieve device and has a feeding opening and an outlet opening at its opposite ends with a screw transporting the product from the feeding opening to the outlet openings, and a returning member is provided immediately before the outlet opening of the sieve drum.

When the harvester thresher is designed in accordance with the present invention, the entire product stream is supplied into the sieve drum, and only grain and fine chaff and straw particles can escape through the sieve openings of the sieve drum. Coarse impurities are thereby reliably separated at this location.

In accordance with another feature of the present invention, the sieve openings in the sieve drum in the region of the returning member are formed larger than the sieve openings in the remaining region of the sieve drum. In this construction grain losses are avoided as much as possible.

Still another advantageous feature of the present invention is that a blower is associated with the sieve drum and its air supply passage is subdivided into two partial passages so that one partial air stream is supplied into the region between the sieve drum and the flat sieve device, whereas the other partial air stream is supplied directly to the flat sieve of the flat sieve device.

For unobjectionable loading of the sieve drum, the sieve drum extends outwardly beyond the housing of the harvester thresher at its both sides in accordance with a further feature of the present invention.

Still a further feature of the present invention which provides for a simple construction is that a transporting channel is located outside the housing of the harvester thresher and connected by its one end with the feeding opening of the sieve drum and by its other end with a product supply trough. A collecting screw is drivingly supported in the product supply trough.

A very compact construction is provided when the collecting screw of the product supply trough and the screw of the sieve drum extend parallel to the one another.

Finally, the casing of the sieve drum is formed so that its upper third is not provided with the sieve openings, so as to prevent escape of the grains upwardly from the drum.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a side view of a self-propelled harvester thresher in accordance with the present invention;

FIG. 2 is a reduced plan view of the harvester thresher of FIG. 1, with elements formed in accordance with the present invention;

FIG. 5 is a view showing a section of the inventive harvester thresher taken along the line V—V in FIG. 2; and FIG. 6 is a view showing a section taken along the line VI—VI in FIG. 5.

DESCRIPTION OF THE PREFERRED EMBODIMENTS

Figure 3:
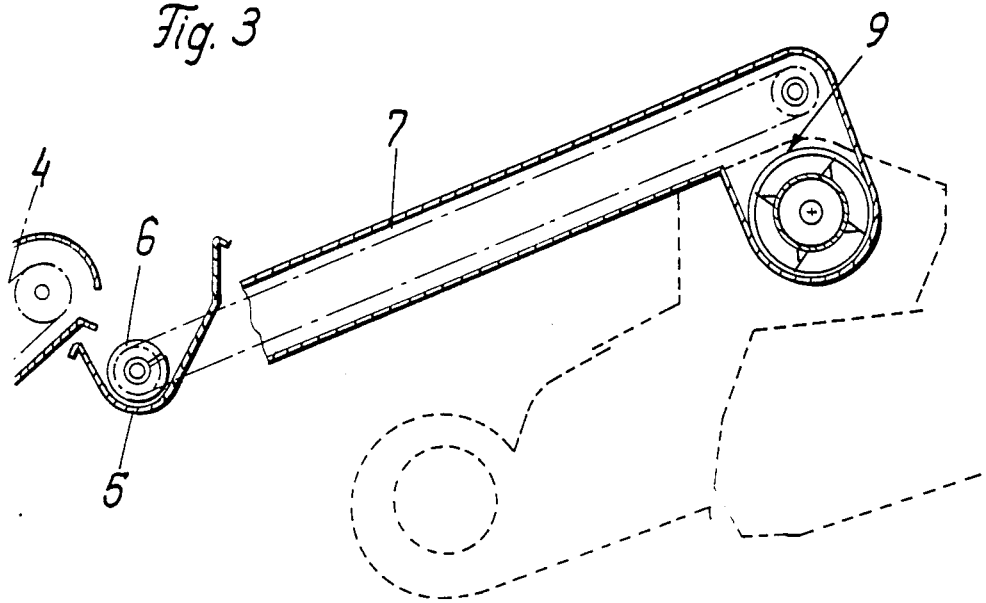
FIG. 3 is a view showing a section of the inventive harvester thresher, taken along the line III—III in FIG. 2.
Figure 4:
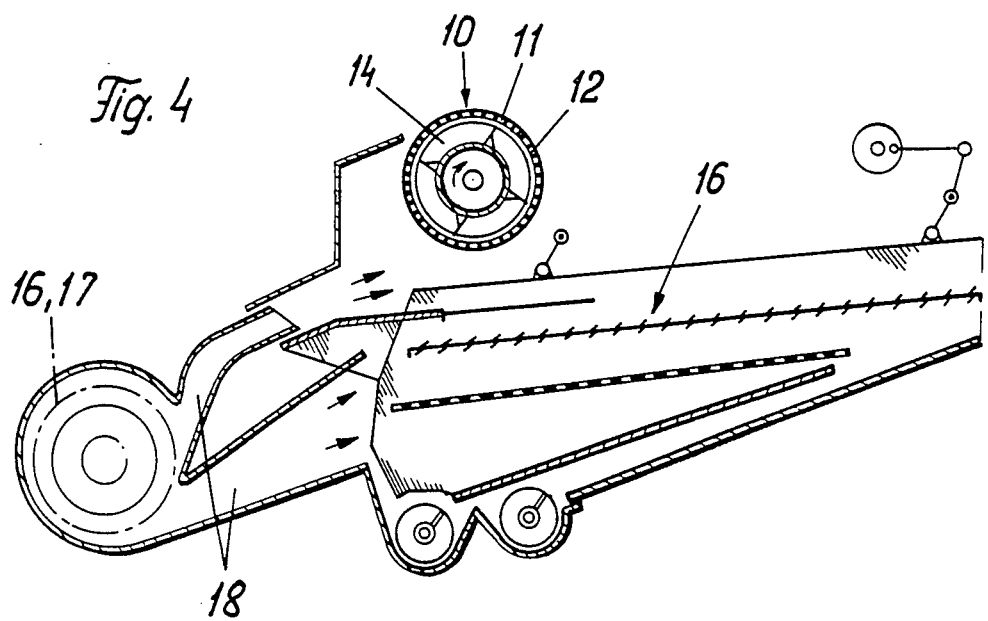
FIG. 4 is a view showing a section of the inventive harvester thresher taken along the line IV—IV in FIG. 2.

A self-propelled harvester thresher is identified as a whole with reference numeral 1. The harvester thresher has a front mower cutter 2 and a threshing and separating mechanism 3 located after the cutter 2 as considered in a product supply direction. The threshing and separating mechanism 3 operates in accordance with the principle of axial flow. An inclined conveyor 4 follows the threshing and separating mechanism 3, and an upwardly open product supply trough 5 which supports a driven collecting screw 6 is located after the inclined conveyor 4.

The straw-chaff-grain mixture separated by the threshing and separating mechanism 3 is supplied by the inclined conveyor 4 over its entire width into the product supply trough 5 with the driven collecting screw 6. The collecting screw 6 supplies the product stream to an inclined rising transporting channel 7 which is connected with a side end of the product supply trough 5.

Reference numeral 10 identifies a stationary sieve drum 10 which has a casing 11. The casing 11 has a plurality of sieve openings 12 and 13. However, in its upper third the casing 11 does not have sieve openings. A screw 14 is supported in the sieve drum 10. As can be seen from FIG. 2, the transporting channel 7 is located outside of a housing 8 of the harvester thresher and leads to a feeding opening 9 of the stationary sieve drum 10. The screw 14 of the sieve drum 10 transports the grain-chaff-straw mixture to an outlet opening 15 located at the side end of the screw.

A flat sieve device 16 is further provided. It is associated with two blowers 17 and a guiding passage 18. During transportation of the abovementioned grain-chaff-straw mixture to the side end outlet opening 15 the grain with impurities falls through the sieve openings 12 of the casing 11 of the sieve drum 10, and then onto the flat sieve device 16. Air is blown by the blowers 17 and the guiding passage 18 through the falling grain-chaff stream, so that a greater part of impurities composed of chaff and short straw is separated. The final cleaning is then taken care in a known manner by the flat sieve device.

As can be seen from FIC. 4, the guiding passage 18 is subdivided into two partial passages so as to guide to the flat sieve device one partial air stream. For preventing throwing onto the field of grains which still remain in the chaff-short straw mixture, a known returning member 19 is arranged directly before the outlet opening 15 on the casing 11 of the sieve drum 10. The remaining grains and a small part of chaff and short straw is supplied back by the returning member 19 to the product supply trough 5. For this purpose, the sieve openings 13 which are provided in the sieve casing 11 in its region associated with the transferring member 19 are larger than the remaining sieve openings.

It will be understood that each of the elements described above, or two or more together, may also find a useful application in other types of constructions differing from the types described above.

While the invention has been illustrated and described as embodied in a self-propelled harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A self-propelled harvester thresher, comprising a housing having two sides; threshing and separating means; flat sieve means arranged after said threshing and separating means as considered in a travelling direction; and a sieve drum extending transversely to the travelling direction between said threshing and separating means and said flat sieve means for acting on a straw-chaff-grain mixture, said sieve drum being located stationarily above said flat aieve means and having two ends, said sieve drum being provided with a feed opening at its one end and an outlet opening at its other end and with transporting means for transporting the product from said feeding opening to said outlet opening; a product supply trough located between said threshing and separating means and said sieve drum; a transporting channel located outside of one side of said housing and having one end which faces toward said sieve drum and is connected with said feeding opening of said sieve drum, and another end which faces away of said sieve drum and is connected with said product supply trough; a grain-chaff returning member loacated immediately before said outlet opening of said sieve drum; and a screw located in said sieve drum and forming transporting means for transporting the product from said feeding opening to said outlet opening.

2. A self-propelled harvester thresher as defined in claim 1, wherein said sieve drum has a casing, and a screw located in said casing and forming said transporting mean for transporting the product from said feeding opening to said outlet opening.

3. A self-propelled harvester thresher as defined in claim 1, wherein said sieve drum is provided with a plurality of sieve openings, said sieve drum having a region which is associated with said returning member and also having a remaining region, said sieve openings in said region associated with said returning member being larger than said sieve openings in said remaining region.

4. A self-propelled harvester thresher as defined in claim 1; and further comprising at least one blower and an air supply passage subdivided into two parts so as to form one partial air stream directed to the region between said sieve drum and said flat sieve means and another partial air stream directed directly to said flat sieve means.

5. A self-propelled harvester thresher as defined in claim 1; and further comprising a housing having two sides, said sieve drum being formed so that it extends laterally beyond both said sides of said housing.

6. A self-propelled harvester thresher as defined in claim 1; and further comprising a collecting screw which is drivingly supported in said product supply trough.

7. A self-propelled harvester thresher as defined in claim 6, wherein said sieve drum has a screw, said collecting screw of said product supply trough and said screw of said sieve drum being arranged parallel to one another.

8. A self-propelled harvester thresher as defined in claim 1, wherein said sieve drum has a sieve casing provided with a plurality of openings, said casing having an upper third which does not have said sieve opening.

9. A self-propelled harvester thresher as defined in claim 1, wherein said sieve drum has a casing, said casing having two end portions and being provided with a plurality of sieve openings, said sieve openings in one of said end portions of said casing being larger than said sieve openings in the other of said end portions of said casing.

* * * * *